United States Patent
Crawford et al.

[11] Patent Number: 6,109,399
[45] Date of Patent: Aug. 29, 2000

[54] BRAKE SHOE AND PRODUCTION METHOD THEREFOR

[76] Inventors: Ted G. Crawford, 460 Pennsylvania St., Denver, Colo. 80203; John F. DuVall, 670 Sage Cir., Highlands Ranch, Colo. 80126

[21] Appl. No.: 08/971,624

[22] Filed: Aug. 26, 1997

Related U.S. Application Data

[63] Continuation-in-part of application No. 08/286,645, Aug. 5, 1994, abandoned.

[51] Int. Cl.[7] .................................................. F16D 69/00
[52] U.S. Cl. ................................ 188/250 B; 188/24.11; 188/24.12; 188/250 G
[58] Field of Search ........................... 188/24.11, 24.12, 188/24.22, 250 B, 250 G, 251 R; 428/317.7, 423.1

[56] References Cited

U.S. PATENT DOCUMENTS

| | | | |
|---|---|---|---|
| 1,462,391 | 7/1923 | Stokes . | |
| 3,840,093 | 10/1974 | Hamayasu | 188/24.12 |
| 4,036,333 | 7/1977 | Mathauser | 188/24.11 |
| 4,230,208 | 10/1980 | Gale . | |
| 4,254,848 | 3/1981 | Moss . | |
| 4,417,724 | 11/1983 | Bikker . | |
| 4,611,692 | 9/1986 | Everett | 188/24.12 |
| 4,727,094 | 2/1988 | Hoy et al. | 521/164 |
| 4,728,552 | 3/1988 | Jensen, Jr. . | |
| 5,064,027 | 11/1991 | Akamatsu . | |
| 5,083,650 | 1/1992 | Seiz et al. . | |
| 5,107,965 | 4/1992 | Yates . | |

FOREIGN PATENT DOCUMENTS

| | | |
|---|---|---|
| 447714 | 11/1986 | European Pat. Off. . |
| 542175 | 4/1956 | Italy . |
| 2173267 | 9/1991 | United Kingdom . |

OTHER PUBLICATIONS

"Engineering Properties Of Cyanaprene", by Cyanamid, May 1995.

*Primary Examiner*—Robert J. Oberleitner
*Assistant Examiner*—Devon Kramer
*Attorney, Agent, or Firm*—Timothy J. Martin; Michael R. Henson; Mark H. Weygandt

[57] ABSTRACT

The present invention is directed to a brake shoe adapted for use in a braking mechanism that comprises a support member and a substantially metal free brake pad disposed on the support member. The brake pad may be composed of polymerized urethane as a major constituent thereof. More particularly, the brake pad may be composed of a mixture including urethane, a urethane reactant and a urethane curing agent. The durometer hardness of the brake pad may be between 80 and 95 on the A-scale. The support member may include a connector and a base plate, and the brake pad may be formed as an integral one-piece molded construction with the base plate being embedded in the brake pad. The brake pad may have a contact surface that is contoured so that the brake pad has varying thickness to differentially contact a moving surface. The present invention also provides a caliper-type braking mechanism having a brake shoe including a brake pad disposed thereon, wherein the brake shoe is adapted to be secured to a free end of a brake arm of the caliper-type braking mechanism. Additionally, the present invention is directed to a method of fabricating a brake shoe adapted for use in a caliper-type braking mechanism.

34 Claims, 2 Drawing Sheets

BRAKE SHOE AND PRODUCTION METHOD THEREFOR

RELATED APPLICATION

The present application is a continuation-in-part of application Ser. No. 08/286,645 entitled Brake Shoe and Production Method Therefor, filed Aug. 5, 1994 abandoned.

FIELD OF THE INVENTION

The present invention generally concerns brake shoes, and is particular directed to brake pads adapted to be placed in sliding contact with a flat braking surface. Specifically, the present invention concerns brake shoes and methods for making the same wherein the brake shoes have brake pads that may be placed in contact with a planar surface so as to apply a braking force thereto. In particular, the present invention is directed to brake shoes for brake assemblies commonly used on cycle vehicles.

BACKGROUND OF THE INVENTION

Since the advent of mechanized transportation by way of wheeled vehicles, the desirability of incorporating a braking mechanism into such a vehicle has been recognized. Such braking assemblies are necessary to control the speed of the vehicle as well as to bring it to a stop at a desired location. The typical brake for such a vehicle utilizes a braking member which is brought into contact with either the wheel itself or a mechanical element which rotates in conjunction with the wheel so that a frictional force applied by the braking element acts to retard and then stop the wheel rotation. Among the various braking mechanisms known, motorized vehicles of today's manufacturers typically employ either drum brakes, disk brakes or a combination of the two.

As is well known, a drum brake incorporates a plurality of arcuate brake shoes mounted inside a wheel drum which supports a wheel or tire. Upon activation, the brake shoes move radially outwardly to contact the inner arcuate surface of the drum and thereby apply a braking force. On the other hand, disk brakes employ a disk-shaped element which rotates rigidly with respect to the wheel. Here, a caliper mechanism straddles the edge of the disk, and a pair of opposed brake pads are positioned between the ends of the caliper structure so that, upon actuation, the brake pads are advanced towards one another thereby trapping the disk between their braking surfaces thereby applying the braking force. In either event, the brake pads or brake shoes employ brake pad elements that are typically constructed of a hard non-lubricous composite.

Many pedal powered cycle vehicles, such as bicycles, tricycles and the like, employ the caliper brake concept but utilize a different mechanical structure since typically the work necessary to bring the vehicle to a stop is less for a pedal powered vehicle than a motorized vehicle due to the reduced mass in motion. These brakes include those known both as "caliper" brakes and "cantilever" brakes. In either event, the caliper brake assembly for pedal powered vehicles typically employs a pair of brake arms that are pivoted to the frame of the cycle vehicle and terminate in free ends on either side of the rim of the cycle's wheel. Brake shoes are mounted in opposed, facing relationship to one another on either side of the wheel rim. The operator employs a hand brake lever to reciprocate a wire inside a cable with this wire connected to the brake arms so as to pivotally advance the free ends toward and away from the wheel rim so that the brake shoes may be placed in a braking state wherein the brake shoe engages the moving wheel rim and in a brake release state wherein the brake shoe is disengaged from the wheel rim.

While bicycle brakes are currently undergoing revolutionary changes in design, materials and usage, brake shoes and their brake pads have remained remarkably unchanged. For a number of decades these brake shoes have utilized a brake pad constructed of carbon-infused rubber which is thought to have a high coefficient of friction and thus a good material for such a brake pad. Even though cyclists are today riding more aggressively and demanding more control of their cycle vehicles through higher performance of the cycle components, little has been done to improve brake pad performance. Such innovation has been directed to varying tread designs for the brake pad body.

While rubber brake shoes have been relatively effective in their application of braking force to a bicycle wheel, there remains many problems associated with such structures. Where these brake pads have a high coefficient of friction, they are typically subject to increased sliding abrasion so that, for cyclists who ride frequently or aggressively, especially over rugged terrain, brake shoes will typically wear out in a short period of time, often within one week. Moreover, the wear of brake shoes during braking events deposits brake material on the wheel rim. This deposit often hardens into a glaze which may make braking less efficient; this glaze is often difficult to remove. Likewise, the surface of the brake shoe is also subjected to such glazing which is similarly difficult to remove.

The use of such rubber brake pads can also cause damage to the bicycle wheel. On one hand, worn brake shoes often expose parts of their metal support structures, and contact of the metal support structure on the metal rim can cause extensive damage. Rubber brake pads may become embedded with small slivers of aluminum from the wheel rim; when applied, the brake pads then further score the rim.

A significant disadvantage of rubber brake shoes appears when the cycle is ridden in wet or raining conditions. When such conditions exist, moisture collects on the wheel rim and such moisture greatly reduces the coefficient of friction between the brake pad and the wheel rim to such a degree that it is not uncommon for accidents and injury to result due to the inability of the cyclist to brake effectively when confronted with hazards. This is exacerbated by the presence of abraded rubber particles and dust deposited on the rim since such particles may become suspended in the moisture, thus forming a lubricous film.

As noted above and despite the disadvantages mentioned, there has been little done to improve brake pads. Thus, there has been a long felt need for such improvements in pad material, construction and the methods of manufacturing the same.

The present invention attempts to meet this need by providing a brake shoe incorporating a urethane-based brake pad that has high tensile and compression properties and which exhibits superior braking performance, especially in wet conditions. While this brake shoe is especially constructed for use with caliper-type brakes for bicycles and other cycle vehicles, the advantages provided by this brake shoe could be employed, as desired, in other mechanized vehicle applications.

SUMMARY OF THE INVENTION

It is an object of the present invention to provide a new and useful brake shoe and construction method therefor which utilizes a urethane-based material.

Another object of the present invention is to provide a brake shoe and construction method that produces a relatively inexpensive yet highly useful brake shoe.

A further object of the present invention is to provide a brake shoe for bicycles and other cycle vehicles wherein the brake shoe provides superior control for the cyclists.

Another object of the present invention is to provide a brake shoe that has a high compression modulus so that it exhibits a greater sensitivity of braking action.

Still a further object of the present invention is to provide a brake shoe for cycle vehicles that has superior performance in wet conditions.

Yet another object of the present invention is to provide a brake shoe for bicycles and other cycle vehicles which is more durable and therefore longer lasting.

Still another object of the present invention is to provide a brake shoe for cycle vehicles that permits differential brake surface engagement.

Yet another object of the present invention is to provide a fabrication method for brake shoes for cycle vehicles wherein the brake pad is integrally molded directly onto the brake shoe support element.

Accordingly, a brake shoe and a construction method for such brake shoe is described herein. The brake shoe according to the broad form of the present invention is adapted for use in a braking mechanism and is further adapted to be selectively placed by the braking mechanism in operative contact with a moving surface of a machine part associated with the braking mechanism so that a frictional braking force may be applied to the moving surface when a normal force is applied to the brake shoe.

In its broad form, this brake shoe includes a support member, and a brake pad is disposed on this support member so as to contact the moving surface. Here, the brake pad is composed of a mixture including a urethane resin, a urethane reactant and a urethane curative mixed in proportion such that the brake pad has a resulting durometer hardness of between 80–95, inclusive, on the durometer A scale. Preferably, the brake pad has a durometer hardness of about 90–95 on the A scale. The urethane resin may be mixture of various polyols, and one such polyol may be polytetramethyleneglycol. The hardener may suitably be an isocyanate such as methylene di-isocyanate. The curing agent can be an aromatic diamine such as 4–4' methylene-bis-orthochloroanaline. Moreover, it is preferred that the mixture be completely polymerized. If desired, a lubricating compound may be added to the mixture, and this lubricating compound may be selected from a group consisting of molybdenum di-sulfide ($MoS_2$), napthanic oil, waxes and silicone. Where molybdenum di-sulfide ($MoS_2$) is employed as the lubricating compound, it is preferred that the molybdenum di-sulfide ($MoS_2$) comprise between ½ percent and 10 percent of the mixture, by weight, with the selected percentage depending on the type of cycling involved. For the remaining lubricants, it is desirable that the lubricating compound not comprise more than 3% of the mixture, by weight, and in such case it is preferred that the lubricating compound be a wax or napthanic oil in a ratio of about 2.0 to 2.7% of said mixture by weight.

The present invention is also directed to a brake shoe which has a support member including a connector adapted to secure the brake shoe to a braking mechanism so that it may be moved in operative contact with a moving surface of the machine part to apply frictional braking force thereto. Here, the brake shoe includes a support member including a connector adapted to secure the brake to the braking mechanism and a base plate disposed on the connector. A brake pad is then disposed on the support member with the brake pad formed as an integral one-piece molded construction with the base plate being embedded in the brake pad. As noted above, it is preferred that such brake pad be fabricated of a composition which includes a polymerized urethane material as a major constituent thereof. Further, it is desired that the base plate have a plurality of ports formed therethrough so that portions of the brake pad are molded through so as to extend through the ports to help mechanically lock the brake pad onto the support member. In any event, the braking surface of the brake shoe may be contoured to provide differential braking action. For example, the surface can be "saw tooth" in shape or formed by protrusions of differing heights.

The present invention is especially adapted for use in caliper-type braking mechanisms for cycle vehicles which have a frame and a plurality of wheels and wherein the caliper-type braking mechanism employs at least one brake arm that is pivoted to the vehicle frame so as to have a free end that may be selectively actuated to move toward and away from a selected one of the wheels. Here, the improvement comprises a brake shoe adapted to be secured to the free arm of the brake arm so that it is movable between a braking state wherein the brake shoe engages the selected one of the wheels and a brake release state wherein the brake shoe is disengaged from the selected one of the wheels. The brake shoe according to this improvement includes a brake pad disposed thereon and constructed of a composition including a polymerized urethane material as a major constituent thereof.

The urethane material according to this improvement may include polyols, one of which may be polytetramethyleneglycol. A lubricate component may be added as a minor constituent thereof and, where the urethane includes polytetramethyleneglycol, it is preferred that the lubricate component be either: (1) molybdenum di-sulfide ($MoS_2$) in a ratio of about ½% to 10% by weight; or (2) a wax or napthanic oil in a ratio of about 2.0 to 2.7% by weight. Here again, it is preferred that the brake shoe include a base plate and a connector element with the base plate being embedded in the brake pad and, the base plate may include a plurality of ports with the brake pad being an integral piece of material formed so that portions thereof extend through the ports.

The present invention also includes a method of fabricating a brake shoe that is adapted for use in a caliper-type braking mechanism for cycle vehicles wherein the vehicle has a frame and a plurality of wheels and wherein a brake arm is pivoted to the frame so as to have a free end that may be selectively actuated to move toward and away from a selected one of the wheels. The method includes a first step of constructing a support structure to have a connector adapted to be secured to the free end of the brake arm and a base plate. Next, the base plate of the support structure is positioned in a mold cavity of a selected configuration. A molding composition is formed with this molding composition being composed of a mixture including urethane resin, a urethane reactant and a urethane agent. Next, the method includes the step of introducing the molding composition into the mold cavity such that the base plate becomes embedded therein after which the molding composition is cured for a selected first time at a selected first temperature to form a molded body. Finally, the method includes the step of demolding the molded body from the mold cavity after the first time.

In this method, it is preferred that the mixture forming the molding composition include polytetramethyleneglycol, methylene di-isocyanate and a diamine. Further, it is preferred that the mixture include a lubricating agent selected from a group consisting of molybdenum di-sulfide ($MoS_2$), napthanic oil, waxes and silicone. In the method, it is also preferred that the first temperature is selected to be in a range of 140–160° F. and that the first time be selected in a range of 6–7 minutes. The broad method may also include the step of curing the molded body for a selected second time at a selected second temperature. Here, the second time is selected to be in a range of 8–12 hours and the second temperature in a range of 225°–250° F.

These and other objects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention relates to a new and useful brake shoe which incorporates a novel brake pad that is urethane-based. Also, the present invention concerns a new and useful method of manufacturing such a brake shoe. Specifically, the present invention is described in the context of a caliper brake assembly used for a cycle vehicle, such as a bicycle, tricycle and the like. However, it should be understood at the outset that the inventive concepts described herein and the inventive features claimed could be incorporated in other types of braking assemblies. Thus, the description of the present invention as it relates to a caliper braking assembly for a bicycle is for purposes of explanation and not limitation.

In order to best explain this invention, it is helpful to first describe the mechanical structure of the brake shoe, itself, and then discuss the chemical composition of the brake pad. Thereafter, we will address the casting method employed according to the preferred method of the present invention. Finally, examples of configurations having brake surface contours for differential braking will also be noted.

Mechanical Structure of Brake Shoe

Figure 1:
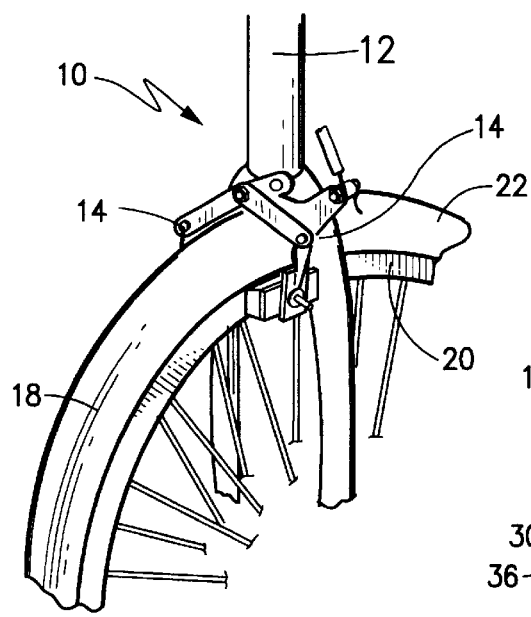
FIG. 1 is a perspective view of a portion of a front wheel assembly and caliper brake employing the brake shoe of the exemplary embodiment of the present invention.

As noted, the present invention concerns a brake shoe which may be adapted for use in a braking mechanism and which is adapted to be selectively placed by the braking mechanism in operative contact with a moving surface of a machine part in order to apply a frictional braking force on the moving surface when a normal force is applied to the brake shoe. A representative embodiment of such a brake shoe is shown in FIGS. 1–4 wherein the description is made of the present invention in conjunction with a cantilever or caliper-type braking mechanism of a bicycle. With reference then to FIG. 1, it may be seen that a representative caliper-type braking mechanism 10 is secured to the fork 12 which forms part of the frame of a cycle vehicle such as a bicycle, tricycle or the like. Caliper-type braking mechanism 10 includes a pair of brake arms 14 which are pivoted to fork 12. Each has a free end, such as free end 16, that may be selectively actuated to move toward and away from a wheel, such as wheel 18, and specifically to rim 20 of wheel 18. Rim 20, in turn, supports ground engaging tire 22 to support frame 12 and the cyclist riding thereon. Actuation of brake arms 14 is accomplished by means of a crank arm 24 which is connected to a cable 26 that may be operated by a standard hand brake known in the art. When crank arm 24 is reciprocated, free ends 16 reciprocate toward and away from rim 20 in the direction of arrows "A" shown in FIG. 2. Sufficient actuation of crank arm 24 moves brake shoe 30 into a braking state wherein each brake shoe 30 engages rim 20 to exert a sliding frictional braking force thereon. Release of crank arm 24 allows each brake shoe 30 to move into a brake release state wherein the brake shoe 30 is disengaged from rim 20 of wheel 18.

Figure 2:
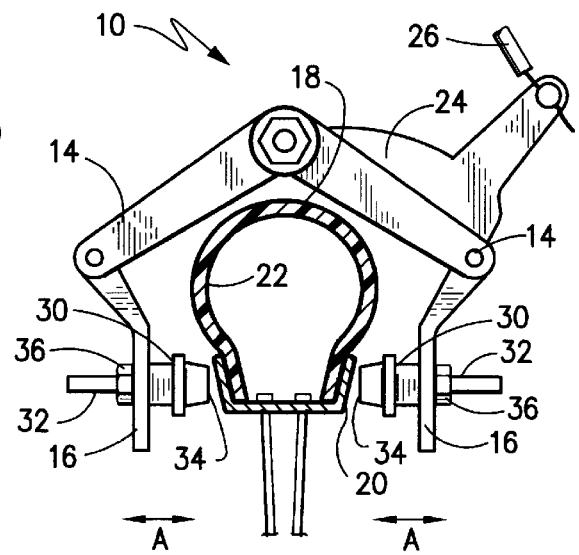
FIG. 2 is an end view in partial cross-section showing the caliper brake assembly of FIG. 1 with the brake shoes according to the exemplary embodiment of the present invention for use with a bicycle tire, shown in cross-section.
Figure 3:
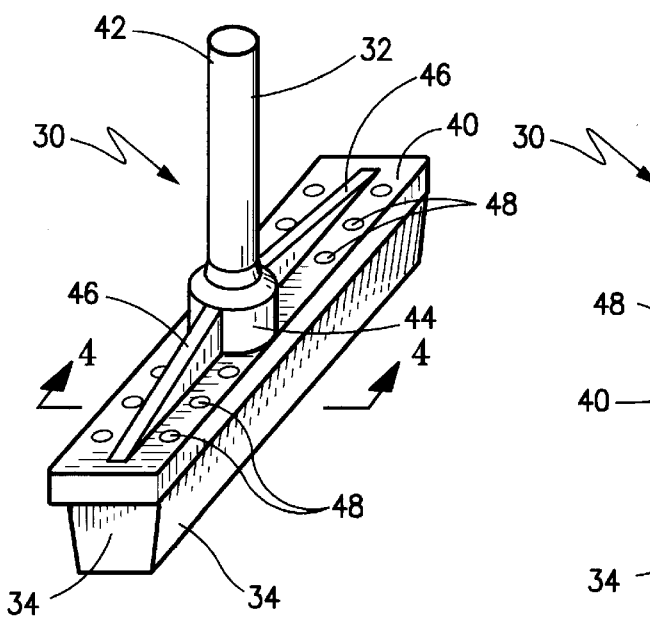
FIG. 3 is a perspective view of a brake shoe according to the exemplary embodiment of the present invention.
Figure 4:
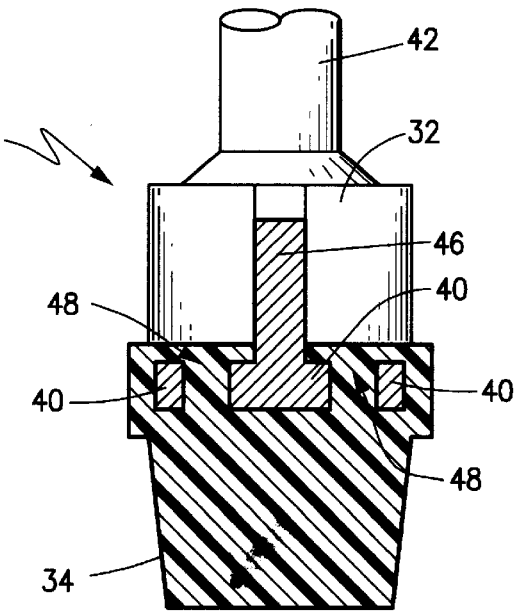
FIG. 4 is a cross-sectional view taken about lines 4—4 of FIG. 3.

The structure of brake shoe 30 according to the first exemplary embodiment of the present invention, then, is best shown in FIGS. 2–4. With reference to these figures, it may be seen that brake shoe 30 includes a support member 32 and a brake pad 34 disposed on support member 32. Brake shoe 30 may be secured to free ends 16 of brake arms 14 in any convenient manner, such as fastening nut 36 shown in FIG. 2.

With reference to FIGS. 3 and 4, it may be seen that support member 32 includes a base plate 40 transversely disposed on a connector element in the form of post 42 that allows securing of brake shoe 30 to the braking assembly. Post 42 includes an enlarged post base 44 adjacent base 40, and a pair of reenforcing webs 46 extend laterally from post base 44 to reenforce and support base 40. Moreover, as is seen in these figures, base 40 includes a plurality of ports 48 extending therethrough to assist in mounting brake pad 34 to base 40. Support member 32 is preferably formed as an integral piece of metal material, such as aluminum, that may be cast or otherwise formed as is known in the art.

With reference to FIG. 4, it may be seen that brake pad 34 is preferably an integral piece of molded material molded with respect to support member 32 so that base plate 40 is completely embedded in brake pad 34. To this end, during the molding process, portions of brake pad 34 extend through each of ports 48 so that pad 34 becomes mechanically locked onto base plate 40 and thus to support member 32. Ports 48 are visible in FIG. 3 since brake pad 34 is translucent when constructed of a urethane material as described below.

Chemical Composition of Brake Pad

It is desirable according to the exemplary embodiments of the present invention that the brake pad be composed of a urethane backbone that is preferably polymerized, completely, by means of a curing agent and a urethane reactant such as an isocyanate so that the resulting brake pad has a durometer hardness of between 80–95, inclusive, on the A scale. Two exemplary compositions will be described although it should be appreciated that the ordinarily skilled person in this field can expand upon these compositions based on the teachings of these applications.

A. System I

The first composition for use in molding brake pad 34 directly onto support member 32 to produce brake shoe 30 employs what is known as 1-shot chemistry wherein an A/B mixture is combined and is inserted into a molding cavity where it is allowed to cure. In this first example, the A-side of the composition is one or more polyols, such as polytetramethyleneglycol and a curing agent. A preferred A-side resin is that known under the Trademark ELASTO-CAST 7086 available from the BASF Corporation of Livonia, Mich. Preferably, this resin is mixed with an aromatic diamine curing agent such as the curing agent sold under the Trademark ETHACURE by the Ethyl Corporation of Baton Rouge, La. The B-side of the mixture is a urethane hardener such as methylene di-isocyanate which is mixed in with the polyol(s) in an amount of approximately 143–145 parts by weight of methylene di-isocyanate to 100 parts polyol. It is preferred that the ratio be adjusted so that the resulting brake pad 34 has a durometer hardness of about 90–95 on the A-scale.

Alternatively, the polyol resin can be mixed with WUC-3236T isocyanate which is a premixed compound available from the BASF Corporation containing proprietary proportions of both ETHACURE and methylene di-isocyanate. Here, the two are mixed in an amount of approximately 143 parts by weight of WUC-3236T isocyanate to 100 parts polyol so that the resulting brake pad 34 has a durometer hardness of approximately 95 on the A-scale.

Furthermore, one aspect of the present invention is the inclusion of a lubricating compound as part of the polyol mixture. In System I, it is preferred that the lubricating compound or agent be molybdenum di-sulfide ($MoS_2$). This lubricate is preferably selected to link chemically with a urethane backbone so that the resulting composition is completely polymerized. The lubricating compound is mixed with the polyols on the A-side of the composition prior to the addition of methylene di-isocyanate. It is preferred that the molybdenum di-sulfide be mixed with the polymers in an amount that is between ½ percent and 10 percent by weight. The particular weight percentage employed necessarily depends on the type of cycling involved.

Alternatively, the System I lubricating compound or agent may be selected from a group consisting of napthanic oil, waxes and silicone with the preferred lubricating compound being a product known as AcroWax available from Lanza Chemical of Flemington, N.J. This lubricant is preferably selected to link chemically with a urethane backbone so that the resulting composition is completely polymerized. The lubricating compound is mixed with the polyols on the A-side of the composition prior to the addition of the methylene di-isocyanate. It is preferred that the lubricant be mixed with the polyols in an amount of less than 3% by weight. Good results were achieved when 2–3% by weight of the lubricant was added, with 2.7% by weight of the lubricant yielding the best results under tests. While silicone is an acceptable lubricant, its introduction makes the resulting brake pad 34 cloudy and/or opaque.

Were a lubricant is used, it is preferred, then, to mix the polyol(s) and lubricant in the desired ratio by weight. The ratio of methylene di-isocyanate and the resulting polyol-lubricant mixture is then blended at 95° F. which results in a composition having a pot life of approximately seventy seconds. The urethane composition is then molded in the desired manner and as described below.

Surprisingly, it has been found that the use of a lubricant in the brake pad according to the present invention does not diminish and may in fact increase the brake performance, especially in wet conditions. Intuitively, the use of a lubricant compound would be expected to cause the brake pad to slide on the moving surface of a machine to have decreased friction and thus less braking force. However, brake pads constructed as described above have exhibited superior braking action as measured by stopping distances for bicycles equipped with these brake pads and with traditional brake pads. Moreover, the use of a lubricant compound significantly lessens squeal of the brake pads during braking.

B. System II

An alterative composition for brake pad 34 has been tested and, while System I is preferred, this System II has been found acceptable. Here, a urethane prepolymer known under the trademark ADIPRENE of the Uniroyal Corporation of Naugatuck, Conn. is mixed with a reactant which is again an isocyanate, but here preferably toluene di-isocyanate to form the A-side. The B side is a curing agent such as an aromatic diamine. Here it is preferred that the curing agent by 4–4' methylene-bis-orthochloroanaline ("MOCA"). A lubricant compound may be added to the ADIPRENE and toluene di-isocyanate mixture on the A-side. Here, paraffin was tested and found acceptable as a lubricating agent, although paraffin does not chemically bond to the urethane backbone but rather resides in the resulting composition as a homogeneous mixture. Up to 4% by weight of paraffin was found usable, although at 4% the resulting product was unattractive since the paraffin "bloomed" in the cured brake pad so that it had a flaky appearance. Typically, the A-side of System II, with the exception of the lubricating compound, is premixed in ratio of the polyether polyol and the toluene di-isocyanate and is sold under the above aforementioned ADIPRENE. The amount of MOCA curing agent to be added is dictated that the NCO content specified by the manufacturer.

While this system has been found acceptable, it requires a longer molding time and is more difficult to work with. Further, the System II composition is more sensitive to molding temperatures that must be less than 210°.

C. Casting Method

According to the method of the present invention, a method of fabricating a brake shoe adapted for use in a caliper-type braking mechanism for a cycle vehicle is provided where the vehicle has a frame and a plurality of wheels and wherein a brake arm is pivoted to the frame so as to have a free end that may be selectively actuated to move toward and away from a selected one of the wheels. The method comprises the first step of constructing a support structure to have a connector adapted to be secured to the free end of the brake arm and a base plate. Here, the connector may be a connecting rod and the base plate may be a rectangular plate oriented transversely to the longitudinal central axis of the connecting rod. Next, the method includes the positioning of the base plate in a mold cavity of a selected configuration and, here, it is preferred that the configuration be a truncated triangular prism having a trapezoidal cross-section as is shown in FIG. 4. The method also includes the step of forming a molding composition composed of a mixture including urethane, urethane hardener and a urethane curing agent, as described above with respect to System I and System II. This molding composition is then introduced into the mold cavity such that the base plate becomes embedded therein. The molding composition is then cured in the molding cavity for a selected first time at a selected first temperature to form a molded body and, thereafter, the method includes the step of demolding said molded body from the mold cavity after the first time. After demolding, the method according to the present invention can also include the step of curing the molded body for a selected second time at a selected temperature to form the final brake shoe.

Where System I is employed, it is preferred that the first time be selected to be in a range of 6–7 minutes and the first temperature selected to be in a range of 140°–160° F. Preferably, the step of curing the molded composition for the first time is accomplished at 150° F. Further, it is preferred that the second time be in a range of 8–12 hours and the second temperature be in a range of 225°–250° F. for System I.

Where System II is used, it is preferred that the first curing time be approximately 10–15 minutes at a first selected temperature of 180°–212° F. Here, the second molding time is 6 to 7 minutes and the second molding temperature is 140°–180° F.

In either event, it is preferred that the molding composition include a lubricating agent selected from a group consisting of molybdenum di-sulfide, napthanic oil, waxes, silicone and paraffin.

D. Brake Pad Configurations

Referring now to FIGS. 5–8, it may be seen that preferably the contact surface of the brake pad according to the exemplary embodiments of the present invention is contoured so as to provide differential braking upon application of the normal force against the moving surface of the machine part, such as the metal rim of a bicycle wheel. This differential braking is provided by contouring the contact surface of the brake pad so that the brake pad has a varying thickness at different contact areas so that increasing the normal force causes larger surface areas to come progressively into contact with the moving surface thereby to increase the braking force.

Figure 5:
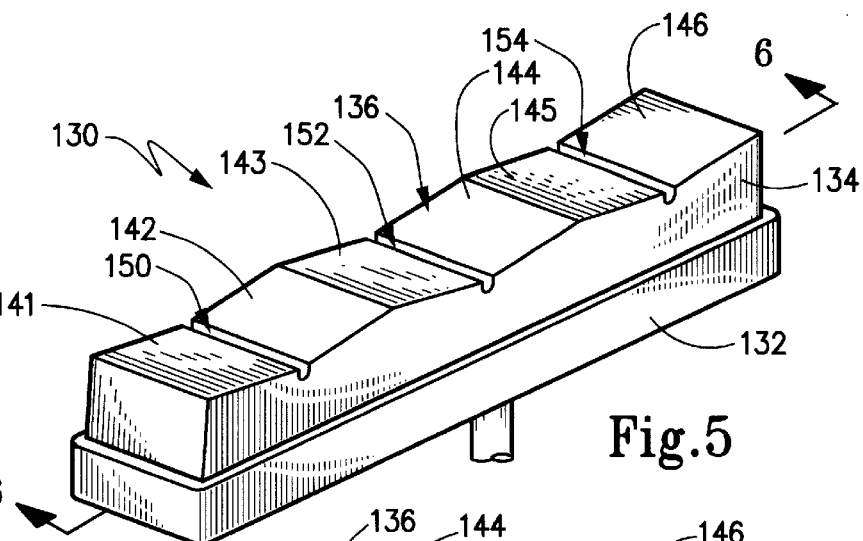
FIG. 5 is a perspective view of a second exemplary embodiment of a brake shoe according to the present invention showing an example of a surface contour for differential braking.
Figure 6:
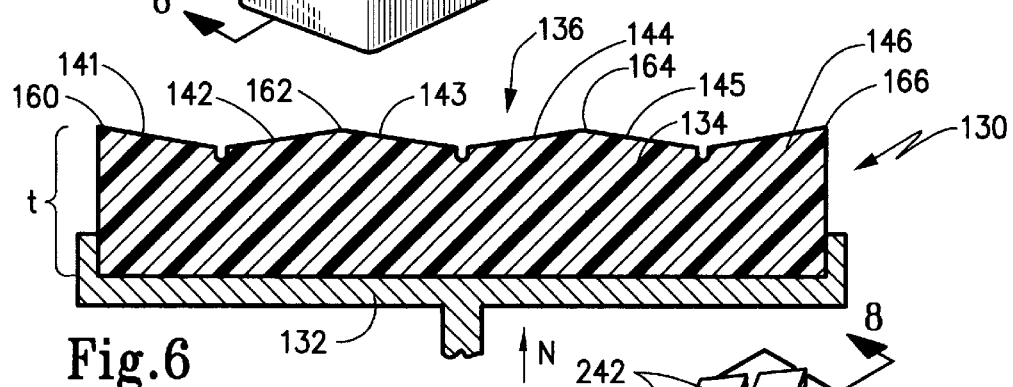
FIG. 6 is a cross-sectional view taken about lines 6—6 of FIG. 5.

For example, as is shown in FIGS. 5 and 6, brake shoe 130 includes a support member 132 that is cup-shaped in configuration, and a brake pad 134 is secured in support 132, for example, by means of an adhesive. Brake pad 134 has an upper contact surface 136 formed by a plurality of planar areas 141–146 with adjacent ones of these surface areas being oriented at a large obtuse angle with respect to one another. Small channels 150, 152 and 154 respectively extend transversely of brake pad 134 at the vertices, respectively, of pairs of planar areas 141, 142 and 143, 144 and 145, 146. Accordingly, brake pad 134 has a thickness "t" which varies along its length. When surface 136 is placed in contact with the moving surface of a machine part, such as the rim of a bicycle wheel, peaks 160, 162, 164 and 166 first come in contact with the moving part with increasing normal force in the direction of force vector "N" will cause larger and larger surface areas to contact the moving part thus providing differential contact and differential braking.

Figure 7:
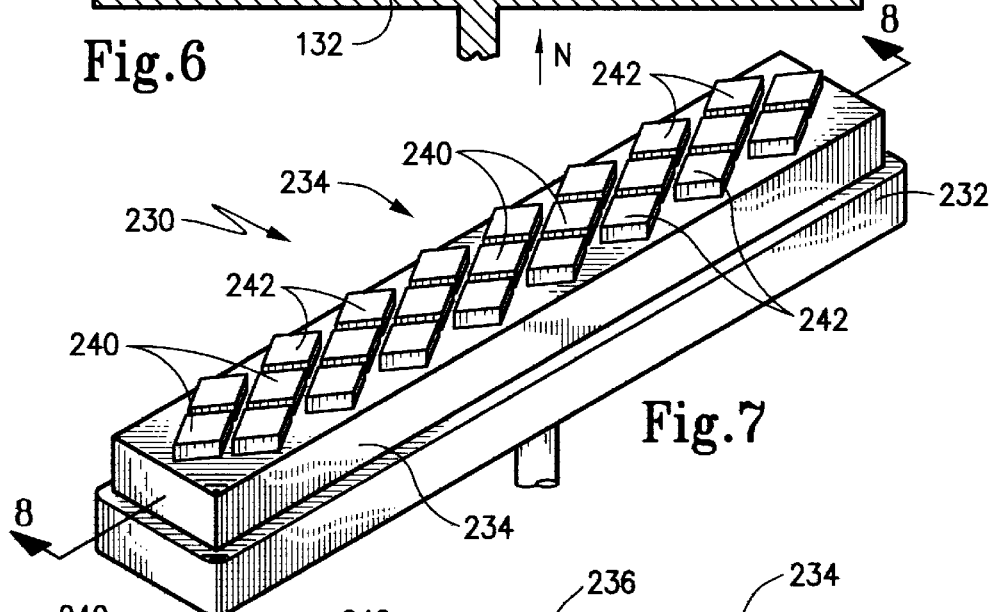
FIG. 7 is a perspective view of a third exemplary embodiment of a brake shoe according to the present invention showing another example of a surface contour for differential braking.
Figure 8:
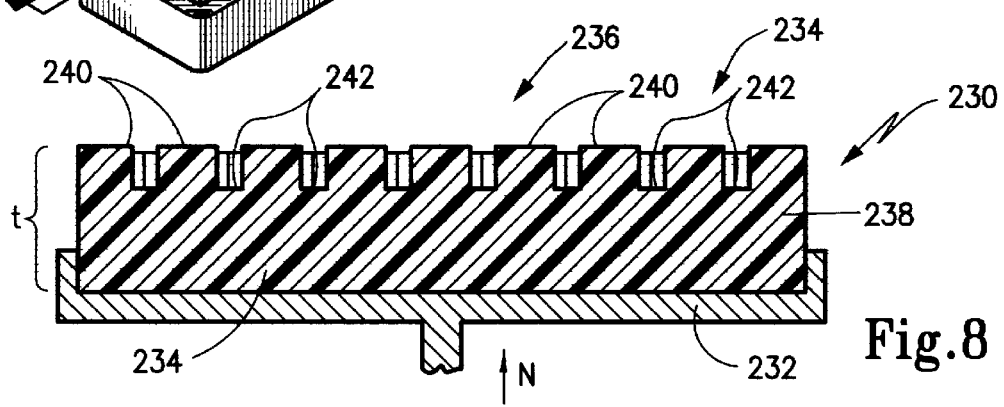
FIG. 8 is a cross-sectional view taken about lines 8—8 of FIG. 7.

This differential braking can, of course, be accomplished by a variety of different contoured surfaces of the brake pad according to the present invention. Another exemplary embodiment is shown in FIGS. 7 and 8. Here, brake shoe 230 includes a cup shaped support 232 which is substantially the same as that described with respect to support 132, above. Brake pad 234 again has a varying thickness "t", but here, the contoured surface 236 is provided by a plurality of protrusions having different heights from the main body 238 of brake pad 234. For example, a longitudinal row of protrusions, such as protrusions 240, have a height that is greater than the protrusions 242 located in longitudinal rows on opposite lateral sides of the row of protrusions 240. Accordingly, when brake shoe 230 is advanced in the direction of normal force vector "N", the upper surfaces of protrusions 240 first come in contact with the moving surface of the machine part. Increasing the normal force compresses protrusions 240 until protrusions 242 also come in contact thus increasing the contact area in providing differential braking.

It should be understood that the differential contact described with respect to the examples shown in FIGS. 5–8 is for illustrative purposes only. The construction of these brake shoes could take different contour surfaces to provide the differential braking. Moreover, the mounting of the brake pads could be done in any conventional manner other than described above with respect to the integral molding of the brake pad with the support.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A brake shoe adapted for use in a braking mechanism and adapted to be selectively placed by said braking mechanism operatively in contact with a moving surface of a machine part to apply a frictional braking force on said moving surface when a normal force is applied to said brake shoe, comprising:
   (a) a support member; and
   (b) a substantially metal free brake pad disposed on said support member, said brake pad composed of a mixture including urethane, a urethane reactant and a urethane curing agent such that said brake pad has a resulting durometer hardness of between 80 and 95, inclusive, on the A-scale.

2. A brake shoe according to claim 1 wherein said brake pad has a durometer hardness of between 90–95, inclusively, on the A-scale.

3. A brake shoe according to claim 1 wherein said mixture includes a lubricating compound.

4. A brake shoe according to claim 3 wherein said mixture is completely polymerized.

5. A brake shoe according to claim 3 wherein said lubricating compound is selected from a group consisting of molybdenum di-sulfide, napthanic oil, silicone, wax and paraffin.

6. A brake shoe according to claim 5 wherein said lubricating compound is molybdenum di-sulfide and comprises between ½% and 10%, inclusively, of said mixture by weight.

7. A brake shoe according to claim 3 wherein said lubricating compound comprises three percent (3%) or less of said mixture by weight.

8. A brake shoe according to claim 7 wherein said lubricating agent is napthanic oil in a ratio of about 2.7% of said mixture by weight.

9. A brake shoe according to claim 1 wherein said urethane includes polyols.

10. A brake shoe according to claim 9 wherein said urethane includes polytetramethyleneglycol.

11. A brake shoe according to claim 10 wherein said reactant is methylene di-isocyanate and wherein said curing agent is an aromatic diamine.

12. A brake shoe according to claim 1 wherein said support member includes a connector adapted to secure said brake shoe to said braking assembly and a base plate disposed on said connector, said base plate being embedded in said brake pad.

13. A brake shoe according to claim 12 wherein said base plate has a plurality of ports formed therethrough, said brake pad being an integral piece of molded material formed such that portions thereof extend through said ports.

14. A brake shoe according to claim 1 wherein said brake pad has a contact surface operative to contact the moving surface of said machine, said contact surface being contoured so that said brake pad has varying thickness whereby said contact surface will differentially contact the moving surface as said contact surface is advanced thereagainst.

15. A brake shoe according to claim 14 wherein said contact surface is formed by a plurality of planar areas oriented at angles with respect to one another.

16. A brake shoe according to claim 14 wherein said contact surface is formed by a plurality of protrusions projecting from said brake pad, at least some of said protrusions having a height that is different from other ones of said protrusions.

17. A brake shoe adapted for use in a braking mechanism and adapted to be selectively placed by said braking mechanism operatively in contact with a moving surface of a machine part to apply a frictional braking force on said moving surface when a normal force is applied to said brake shoe, comprising:
  (a) a support member including a connector adapted to secure said brake shoe to said braking mechanism and a base plate disposed on said connector, said base plate having a plurality of ports formed therethrough; and
  (b) a brake pad disposed on said support member, said brake pad formed as an integral one-piece molded construction with said base plate being embedded in said brake pad with portions thereof extending through said ports, said brake pad having a contact surface operative to contact the moving surface of said machine, said contact surface being contoured so that said brake pad has varying thickness whereby said contact surface will differentially contact the moving surface as said contact surface is advanced thereagainst, said brake pad formed of a substantially metal free composition including polymerized urethane as a major constituent thereof.

18. A brake shoe according to claim 17 wherein said composition includes a lubricant component as a minor constituent thereof.

19. In a caliper-type braking mechanism for a cycle vehicle having a frame and a plurality of wheels wherein a brake arm is pivoted to the frame so as to have a free end that may be selectively actuated to move toward and away from a selected one of said wheels, an improvement comprising a brake shoe adapted to be secured to the free end of said brake arm so that it is movable between a braking state wherein said brake shoe engages the selected one of said wheels and a brake release state wherein said brake shoe is disengaged from the selected one of said wheels, said brake shoe including a brake pad disposed thereon and constructed of a substantially metal free composition including a polymerized urethane material as a major constituent thereof.

20. The improvement according to claim 19 wherein said urethane material includes polyols.

21. The improvement according to claim 20 wherein said urethane includes polytetramethyleneglycol.

22. The improvement according to claim 21 wherein said composition includes a lubricant component as a minor constituent thereof.

23. The improvement according to claim 22 wherein said lubricant component is molybdenum di-sulfide in a ratio of between ½% and 10%, inclusively, of said mixture by weight.

24. The improvement according to claim 22 wherein said lubricant component is napthanic oil in a ratio of about 2.7% of said mixture by weight.

25. The improvement according to claim 19 wherein said brake shoe includes a base plate and a connector element adapted to secure said base plate to the free end of said brake arm, said base plate being embedded in said brake pad.

26. The improvement according to claim 25 wherein said base plate has a plurality of ports formed therethrough, said brake pad being an integral piece of molded material formed such that portions thereof extend through said ports.

27. A method of fabricating a brake shoe adapted for use in a caliper-type braking mechanism for a cycle vehicle having a frame and a plurality of wheels wherein a brake arm is pivoted to the frame so as to have a free end that may be selectively actuated to move toward and away from a selected one of said wheels, comprising the steps of:
  (a) constructing a support structure to have a connector adapted to be secured to the free end of said brake arm and a base plate;
  (b) positioning said base plate in a mold cavity of a selected configuration;
  (c) forming a molding composition composed of a substantially metal free mixture including urethane, a urethane reactant and a urethane curing agent;
  (d) introducing said molding composition into said mold cavity such that said base plate becomes embedded therein;
  (e) curing said molding composition for a selected first time at a selected first temperature to form a molded body; and
  (f) demolding said molded body from said mold cavity after said first time.

28. The method according to claim 27 wherein said mixture includes polytetramethyleneglycol, methylene di-isocyanate and an aromatic diamine.

29. The method according to claim 28 wherein said mixture includes a lubricating agent selected from a group consisting of molybdenum di-sulfide, napthanic oil, waxes and silicone.

30. The method according to claim 27 wherein said first temperature is selected to be in a range of 140° to 160° F.

31. The method according to claim 30 wherein said first time is selected to be in a range of six to seven minutes.

32. The method according to claim 27 including the step of curing said molded body for a selected second time and at a selected second temperature.

33. The method according to claim 32 wherein said second time is in a range of eight to twelve hours and said second temperature is in a range of 225° to 250° F.

34. A brake shoe adapted for use in a braking mechanism and adapted to be selectively placed by said braking mechanism operatively in contact with a moving surface of a machine part to apply a frictional braking force on said moving surface when a normal force is applied to said brake shoe, comprising:

(a) a support member; and
(b) a substantially metal free brake pad disposed on said support member, said brake pad composed of a mixture including urethane, a urethane reactant, a urethane curing agent, and a lubricating compound.

* * * * *